United States Patent [19]

Oberthür

[11] 4,174,867
[45] Nov. 20, 1979

[54] BRAKE FORCE REGULATOR FOR A MOTORCYCLE HYDRAULIC BRAKE SYSTEM

[75] Inventor: Heinrich Oberthür, Offenbac-Rumpenheim, Fed. Rep. of Germany

[73] Assignee: ITT Industries, Inc., New York, N.Y.

[21] Appl. No.: 928,927

[22] Filed: Jul. 28, 1978

[30] Foreign Application Priority Data

Sep. 26, 1977 [DE] Fed. Rep. of Germany ....... 2743204

[51] Int. Cl.² ............................................. B60T 11/20
[52] U.S. Cl. ...................................... 303/6 C; 60/561; 60/581
[58] Field of Search ...................... 303/6 C, 6 A, 24 F; 188/106 P, 349; 60/561, 581, 591; 137/118

[56] References Cited

FOREIGN PATENT DOCUMENTS

2558825 7/1977 Fed. Rep. of Germany .......... 303/6 C

*Primary Examiner*—Reinhard J. Eisenzopf
*Attorney, Agent, or Firm*—John T. O'Halloran; Alfred C. Hill

[57] ABSTRACT

There is disclosed a brake force regulator for a motorcycle hydraulic brake system wherein the pressure from a pedal-operated master cylinder is adapted to actuate a rear-wheel brake and a front-wheel brake, and the pressure from a hand-operated master cylinder is adapted to actuate another front-wheel brake. In this brake system, the brake force regulator provides for reduced supply of pressure to the rear-wheel brake dependent on the pressure from the hand-operated master cylinder when both master cylinders are actuated simultaneously. If only the hand-operated master cylinder is actuated, this will not have any effect on the rearwheel brake.

4 Claims, 1 Drawing Figure

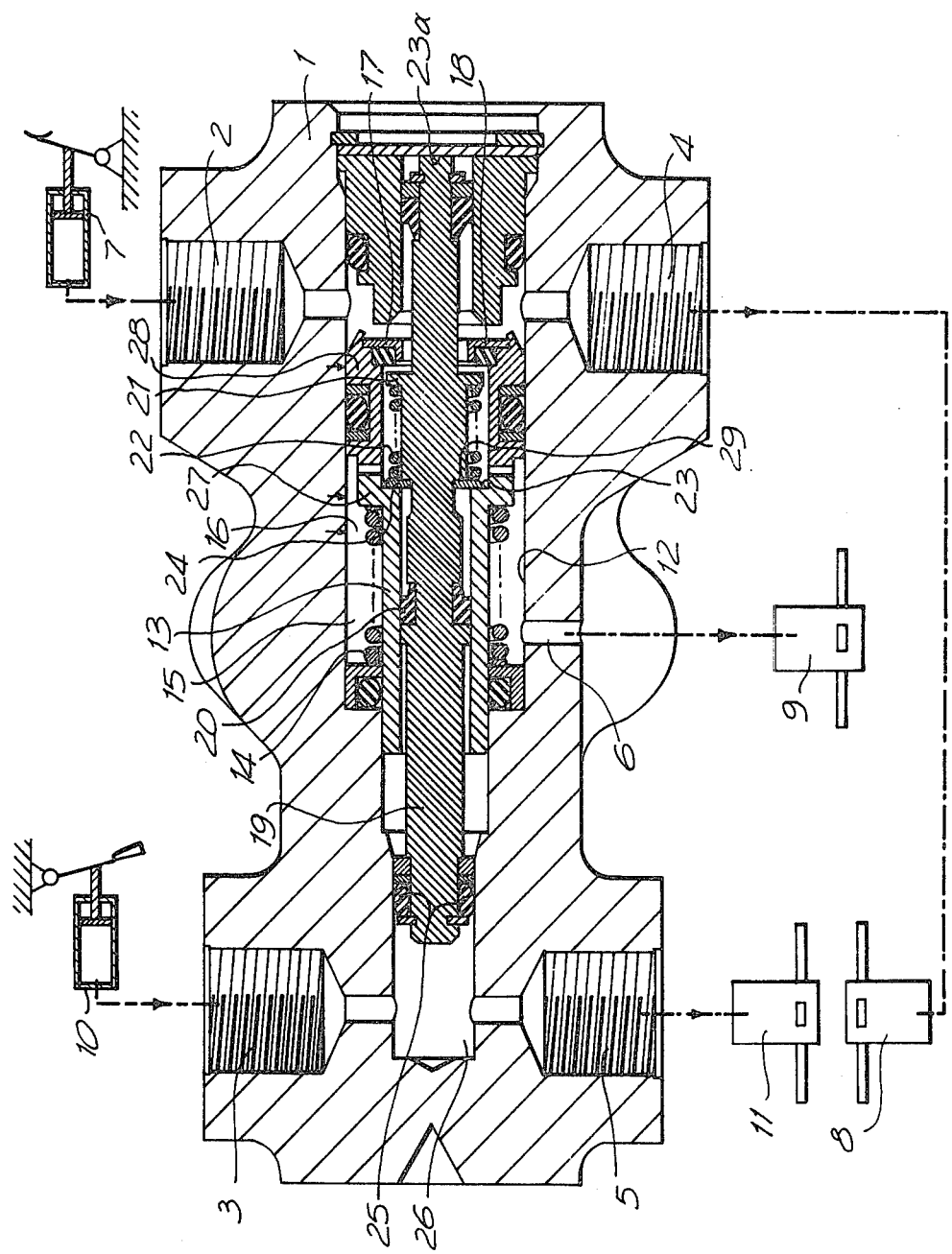

BRAKE FORCE REGULATOR FOR A MOTORCYCLE HYDRAULIC BRAKE SYSTEM

BACKGROUND OF THE INVENTION

This invention relates to a brake force regulator for a motorcycle hydraulic brake system wherein a rear-wheel brake and a front-wheel brake are adapted to be actuated by a pedal-operated master cylinder and another front-wheel brake is adapted to be actuated by a handoperated master cylinder, and wherein the pressure applied to the rear-wheel brake is adapted to be reduced by a brake force regulator dependent on the pressure generated by the hand-operated master cylinder.

A brake force regulator of this type is known from German Printed Patent Application Dt-OS No. 2,558,825. The prior known brake force regulator resembles conventional brake force regulators for passenger cars. By actuating the pedal-operated master cylinder, pressure is initially supplied to a front-wheel brake unreduced and to the rear-wheel brake reduced. If in addition the handoperated master cylinder is actuated, the pressure thereby generated counteracts the control force of the brake force regulator so that the latter reduces the pressure of the rear-wheel brake to a greater extent than if only the pedal-operated master cylinder were actuated. In this arrangement, the brake force regulator is so designed that the displacement travel of its stepped piston is sufficient to reduce the pressure in the rear-wheel brake by means of an increase in the pressure of a front-wheel brake.

The prior known brake force regulator has the functional disadvantage that its stepped piston may be displaced also when pressure is built up only by the hand-operated master cylinder, i.e., when only the hand brake, which acts on the front wheel, is actuated. The displacement of the stepped piston causes pressurized fluid to be drawn from the rear-wheel brake. As a result, a vacuum will occur in the rear-wheel brake which may draw in air and impurities which may result in a failure of the brake.

SUMMARY OF THE INVENTION

It is an object of the present invention to improve a brake force regulator of the type initially referred to in such a manner that the rear-wheel brake remains unaffected when only the hand-operated master cylinder is actuated.

A feature of the present invention is the provision of a brake force regulator for a motorcycle hydraulic brake system having a rear-wheel brake and a first frontwheel brake adapted to be actuated by a pedal-operated master cylinder and a second front-wheel brake adapted to be actuated by a hand-operated master cylinder, wherein the pressure applied to the rear-wheel brake is adapted to be reduced by the brake force regulator dependent on the pressure generated by the hand-operated master cylinder, the brake force regulator comprising: a stepped piston slidable within a stepped bore of a housing against the force of a first spring, the stepped piston having a first effective area exposed to pressure from the pedal-operated master cylinder and a second effective area smaller than the first effective area exposed to pressure in the rear-wheel brake; a seal carried by the stepped piston adjacent the first effective area; a control piston disposed within the stepped piston having a collar thereon adjacent the seal such that displacement of the stepped piston in opposition to the force of the first spring causes the collar and the seal to abut each other and interrupt a pressurized-fluid connection between the pedal-operated master cylinder and the rear-wheel brake, the control piston further having an effective area exposed to pressure from the hand-operated master cylinder, the effective area of the control piston having a force applied thereto in a direction toward the seal; and a stop secured to the housing within the stepped bore adjacent the seal against which the stepped piston and the control piston are held by spring force in their rest position.

The design of the brake force regulator according to the principles of the present invention involves an approach completely different from the prior known brake force regulator referred to hereinabove. With the brake force regulator according to the present invention, actuation of the pedal-operated master cylinder does not result in a reduced pressure supply to the rear-wheel brake, but on the contrary, results in an increased pressure supply as compared to the front-wheel brake. Practice has shown that in contrast to cars, locking of the front wheel of a motorcycle is a greater disadvantage than a rear-wheel lock. When the front wheels stop rotating, the steering ability becomes lost in both cars and motorcycles. In cars this is not always disadvantageous. A motorcyclist, however, requires the steering ability to keep his balance. A fall is inevitable if the steering ability is lost.

Owing to the fact that the brake force regulator of the present invention increases the brake pressure instead of reducing it, it is possible to have the pressure which is produced by the hand-operated master cylinder, act in the brake force regulator such that its stepped piston is held against a stop securely fastened to the housing. With the pedal-operated master cylinder not actuated, there is thus no displacement of the stepped piston and consequently no drawing of pressurized fluid from the rear-wheel brake. Further, it is important that, with the pressure from the hand-operated master cylinder increasing, the control piston is urged in the direction towards the seal of the stepped piston. It is thereby avoided that the pressure from the hand-operated master cylinder causes opening of the connection between the pedal-operated master cylinder and the rearwheel brake.

In an advantageous embodiment of the present invention, in the rest position the stepped piston is held against a step on the control piston by its spring through a disc, and the control piston bears in turn against a stop securely fastened to the housing. This embodiment lends itself to a particularly simple design. Thus, the brake force regulator is inexpensive to manufacture and reliable in its function.

If another advantageous embodiment of the present invention provides for biassing of the control piston in the direction of the seal of the stepped piston by a spring bearing against the stepped piston and the collar on the control piston, the collar will be held against the seal of the stepped piston in a simple manner when the stepped piston has covered an appropriate distance. There is no need for a special area on the control piston to be exposed to pressure in order to hold the latter against the seal of the stepped piston.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a schematic longitudinal cross section of a brake force regulator in accordance with the principles of the present invention.

DESCRIPTION OF THE PREFERRED EMBODIMENT

The brake force regulator illustrated comprises a housing 1 including two fluid inlet ports 2, 3 and three fluid outlet ports 4, 5 and 6. Fluid inlet port 2 is coupled to a pedal-operated master cylinder 7 providing for supply of pressurized fluid to a front-wheel brake 8 through the fluid outlet port 4 and to a rear-wheel brake 9 through the fluid outlet port 6 when master cylinder 7 is actuated. The fluid inlet port 3 is coupled to a hand-operated master cylinder 10 providing for supply of pressurized fluid to another front-wheel brake 11 through the fluid outlet port 5 when master cylinder 10 is actuated.

The housing 1 of the brake force regulator provides a three-step bore 12 therein coaxial of the longitudinal axis of housing 1. In the large- and medium- diameter sections of bore 12, a stepped piston 13 is disposed which is sealed to housing 1 and slidable towards the left when viewing the drawing, in opposition to the force of a spring 14. As a result of this displacement, pressurized fluid is urged out of a work chamber 15 by the smaller effective area 16 of the stepped piston 13 to reach the rear-wheel brake 9 through the fluid outlet port 6.

On its side facing the fluid inlet port 2, the stepped piston 13 has a radially inwardly directed projection 17 including a seal 18. For manufacturing reasons it may be useful to design the stepped piston in two parts.

Within the stepped piston 13 a control piston 19 is arranged which is sealed relative to the stepped piston 13 by a seal 20 and slidable therein. The control piston 19 has a radially outwardly directed collar 21 against which the seal 18 is adapted to bear when the stepped piston 13 is displaced.

A compression spring 22 bears with its one end against a stop 23 of the stepped piston 13 on the side closest to the fluid inlet port 10 and with its other end against the collar 21, thereby biassing the control piston 19 towards the seal 18. In the rest position, the control piston 19 is held against a stop 23a securely fastened to the housing by the stepped piston 13. For this purpose, in the rest position the stepped piston 13 is held against a step 29 of the control piston 19 by the spring 14 through a disc 24 so that ultimately the stepped piston 13 likewise bears against the stop 23a via the control piston 19.

On the side opposite the stop 23a, a control pressure chamber 26 is formed in front of an effective front-end area 25 of the control piston 19, in which chamber the pressure produced by the hand-operated master cylinder 10 and acting on the front-wheel brake 11 is active.

For the subsequent explanation of the mode of operation of the brake force regulator constructed in accordance with the present invention, it is to be noted that the stepped piston 13 has a larger effective area 27 acting in opposition to its smaller effective area 16 and corresponding to an area 28 which is exposed to the pressure supplied from the fluid inlet port 2 when the seal 18 bears against the collar 21. It is to be considered further that the control piston 19 is so dimensioned that the pressure supplied from the fluid inlet port 2 does not exert a force on it.

The operation of the brake force regulator described is the following:

It is assumed first that only the pedal-operated master cylinder 7 is actuated. Pressurized fluid is then supplied through the fluid inlet port 2 into the interior of the brake force regulator. Through the fluid outlet port 4 pressurized fluid is supplied to the one front-wheel brake 8. Through the fluid outlet port 6 pressurized fluid is supplied to the rear-wheel brake 9. When brakes 8 and 9 are applied, pressure builds up. This pressure acts on the larger effective area 27 of the stepped piston 13, displacing it to the left when viewing the drawing in opposition to the force of the spring 14. The control piston 19 does not follow this movement because the compression spring 22 biases it in the opposite direction.

When the stepped piston 13 has covered a short distance, the seal 18 will become seated on the collar 21. The fluid connection from the fluid inlet port 2 to the fluid outlet port 6 is thus interrupted. With the pressure continuing to increase, the stepped piston 13 moves further to the left when viewing the drawing together with the control piston 19. The smaller effective area 16 thereby urges pressurized fluid out of the work chamber 15. Since the pressure produced by the pedal-operated master cylinder 7 acts on the larger effective area 27 of the stepped piston 13, the pressure is intensified.

If the hand-operated master cylinder 10 is actuated in addition to the pedal-operated master cylinder 7, a counterforce will act on the control piston 19 in the control pressure chamber 26 and try to urge the stepped piston 13 back. Depending on the magnitude of this counterforce, either the further pressure increase at the rear-wheel brake 9 becomes less or even there is a pressure decrease as a result of the displacement of the stepped piston 13 to the right when viewing the drawing.

When only the hand-operated master cylinder is actuated, the control piston 19 and the stepped piston 13 remain in their illustrated rest positions. Drawing of brake fluid from the rear-wheel brake 9 is thus not possible.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake force regulator for a motorcycle hydraulic brake system having a rear-wheel brake and a first front-wheel brake adapted to be actuated by a pedal-operated master cylinder and a second front-wheel brake adapted to be actuated by a hand-operated master cylinder, wherein the pressure applied to said rear-wheel brake is adapted to be reduced by said brake force regulator dependent on the pressure generated by said hand-operated master cylinder, said brake force regulator comprising:

a stepped piston slidable within a stepped bore of a housing against the force of a first spring, said stepped piston having a first effective area exposed to pressure from said pedal-operated master cylinder and a second effective area smaller than said first effective area exposed to pressure in said rearwheel brake;

a seal carried by said stepped piston adjacent said first effective area;

a control piston disposed within said stepped piston having a collar thereon adjacent said seal such that displacement of said stepped piston in opposition to the force of said first spring causes said collar and said seal to abut each other and interrupt a pressurized-fluid connection between said pedal-operated master cylinder and said rearwheel brake, said control piston further having an effective area exposed to pressure from said handoperated master cylinder, said effective area of said control piston having a force applied thereto in a direction toward said seal; and a stop secured to said housing within said stepped bore adjacent said seal against which said stepped piston and said control piston are held by spring force in their rest position.

2. A regulator according to claim 1, wherein
in the rest position said stepped piston is held against a step formed in said control piston remote from said collar by said first spring through a disc, and said control piston bears against said stop.

3. A regulator according to claim 2, wherein
said control piston is biassed in the direction of said seal by a second spring bearing against said disc and said collar.

4. A regulator according to claim 1, wherein
said control piston is biassed in the direction of said seal by a second spring bearing against said stepped piston and said collar.

* * * * *